United States Patent
Apostolides

(10) Patent No.: US 6,853,954 B2
(45) Date of Patent: Feb. 8, 2005

(54) METHODS AND SYSTEMS FOR COLLECTING AND PROCESSING DATA IN ASSOCIATION WITH MACHINE OPERATION AND MAINTENANCE

(76) Inventor: John K. Apostolides, 605 Bending Oak La., Pittsburgh, PA (US) 15238

( * ) Notice: Subject to any disclaimer, the term of this patent is extended or adjusted under 35 U.S.C. 154(b) by 104 days.

(21) Appl. No.: 10/253,950

(22) Filed: Sep. 24, 2002

(65) Prior Publication Data

US 2004/0059542 A1 Mar. 25, 2004

(51) Int. Cl.[7] ................................................ G06F 11/00
(52) U.S. Cl. ........................................ 702/182; 714/25
(58) Field of Search ............................ 702/182, 29, 33, 702/35, 113, 114–115, 50, 127, 121–123, 130, 138, 145, 188, 176–178, 183–185; 701/29, 31, 32, 35; 714/25

(56) References Cited

U.S. PATENT DOCUMENTS

| 1,379,259 A | 5/1921 | Hans |
| 1,815,221 A | 7/1931 | Sweetiand |
| 2,029,781 A | 2/1936 | McLean |

(List continued on next page.)

FOREIGN PATENT DOCUMENTS

| DE | 197 43917 A1 | 4/1999 |
| WO | WO 01/63101 A2 | 8/2001 |
| WO | WO 02/27186 A1 | 4/2002 |

OTHER PUBLICATIONS

"Lubrigard Oil Condition Monitoring," accessed Dec. 3, 2002, http://www.lubrigard.com, 1 page.
"Lubrigard Oil Condition Monitoring—Technical Description," accessed Dec. 3, 2002, http://www.lubrigard.com/introduction.htm, 2 pages.
"Lubrigard Oil Condition Monitoring—How it Works," accessed Dec. 3, 2002, http://www.lubrigard.com/works.htm, 2 pages.
"Lubrigard Oil Condition Monitoring—Output Options," accessed Dec. 3, 2002, http://www.lubrigard.com/specifications.htm, 2 pages.

(List continued on next page.)

*Primary Examiner*—Edward Raymond
(74) *Attorney, Agent, or Firm*—Kirkpatrick & Lockhart LLP

(57) ABSTRACT

A method is provided for processing data in connection with operation of a machine. The method includes detecting at least one condition of the machine during an operational state of the machine, wherein the operational state is selected from the group consisting of a dormant state of the machine and a pre-start state of the machine; collecting data indicative of the detected condition; and, performing at least one of storing the collected data and analyzing the collected data for determining whether a fault condition exists in connection with the detected condition of the machine. In another embodiment, a method is provided for operating an emergency machine that includes initiating activation of the emergency machine in response to a signal indicative of an emergency condition communicated to the emergency machine; and, initiating at least one pre-lubrication operation in association with the activation of the emergency machine in response to the communicated emergency condition signal. System and computer-readable media embodiments are also provided in accordance with the various method embodiments discussed herein.

It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR § 1.72(b).

42 Claims, 10 Drawing Sheets

U.S. PATENT DOCUMENTS

| | | |
|---|---|---|
| 2,102,514 A | 12/1937 | Clarkson |
| 2,110,662 A | 3/1938 | Fisher |
| 2,143,533 A | 1/1939 | Archea et al. |
| 2,320,048 A | 5/1943 | Parson |
| 2,499,319 A | 2/1950 | Lillquist |
| 2,518,712 A | 8/1950 | Ovens |
| 2,603,312 A | 7/1952 | Tabet |
| 2,707,463 A | 5/1955 | Booth |
| 2,838,039 A | 6/1958 | Smith et al. |
| 2,887,058 A | 5/1959 | Aspelin et al. |
| 2,928,499 A | 3/1960 | Nallinger |
| 3,045,420 A | 7/1962 | Addie et al. |
| 3,057,436 A | 10/1962 | Jacobson et al. |
| 3,146,720 A | 9/1964 | Henry |
| 3,282,380 A | 11/1966 | Burrell et al. |
| 3,430,730 A | 3/1969 | Kitajima |
| 3,503,412 A | 3/1970 | Schuler |
| 3,583,525 A | 6/1971 | Holcomb |
| 3,583,527 A | 6/1971 | Raichel |
| 3,585,686 A | 6/1971 | Balle |
| 3,658,153 A | 4/1972 | Berman |
| 3,722,623 A | 3/1973 | Waldecker |
| 3,788,294 A | 1/1974 | Logan |
| 3,802,564 A | 4/1974 | Turman |
| 3,826,113 A | 7/1974 | Noraas et al. |
| 3,858,688 A | 1/1975 | Luterick |
| 3,917,027 A | 11/1975 | Hakanson et al. |
| 4,014,794 A | 3/1977 | Lewis |
| 4,058,981 A | 11/1977 | Henson |
| 4,061,204 A | 12/1977 | Kautz, Jr. |
| 4,094,293 A | 6/1978 | Evans |
| 4,095,673 A | 6/1978 | Takeuchi |
| 4,112,910 A | 9/1978 | Percy |
| 4,126,997 A | 11/1978 | Henson |
| 4,157,744 A | 6/1979 | Capriotti |
| 4,168,693 A | 9/1979 | Harrison |
| 4,174,699 A | 11/1979 | Gill |
| 4,185,605 A | 1/1980 | Largent, Sr. |
| 4,199,950 A | 4/1980 | Hakanson et al. |
| 4,240,523 A | 12/1980 | Nestor et al. |
| 4,290,739 A | 9/1981 | Korse |
| 4,331,112 A | 5/1982 | Pluequet |
| 4,354,574 A | 10/1982 | Kieber |
| 4,378,675 A | 4/1983 | Otto |
| 4,402,287 A | 9/1983 | Cochran |
| 4,421,078 A | 12/1983 | Hurner |
| 4,458,644 A | 7/1984 | Papst |
| 4,462,350 A | 7/1984 | Kurata |
| 4,502,431 A | 3/1985 | Lulich |
| 4,502,451 A | 3/1985 | Duprez |
| 4,512,298 A | 4/1985 | Hayashi |
| 4,553,512 A | 11/1985 | Showman |
| 4,628,877 A | 12/1986 | Sundles et al. |
| 4,813,853 A | 3/1989 | Otto et al. |
| 4,834,039 A | 5/1989 | Apostolides |
| 4,875,551 A | 10/1989 | Lulich |
| 4,893,598 A | 1/1990 | Stasiuk |
| 4,965,549 A | 10/1990 | Koike |
| 4,977,978 A | 12/1990 | Batrice |
| 5,014,820 A | 5/1991 | Evans |
| 5,048,578 A | 9/1991 | Dorf et al. |
| 5,056,621 A | 10/1991 | Trevino |
| 5,168,845 A | 12/1992 | Peaker |
| 5,195,476 A | 3/1993 | Schwarz |
| 5,198,698 A | 3/1993 | Paul et al. |
| 5,203,429 A | 4/1993 | Zager |
| 5,236,064 A | 8/1993 | Wagoner |
| 5,244,367 A | 9/1993 | Aslin |
| 5,257,678 A | 11/1993 | Stokes |
| 5,263,445 A | 11/1993 | Bedi et al. |
| 5,327,862 A | 7/1994 | Bedi |
| 5,353,760 A | 10/1994 | Zager |
| 5,390,762 A | 2/1995 | Nelson |
| 5,431,138 A | 7/1995 | Hurner |
| 5,443,138 A | 8/1995 | Bedi et al. |
| 5,452,695 A | 9/1995 | Bedi |
| 5,462,420 A | 10/1995 | Stehr et al. |
| 5,475,270 A | 12/1995 | McRoy |
| 5,511,522 A | 4/1996 | Tran |
| 5,526,782 A | 6/1996 | Bedi et al. |
| 5,566,781 A | 10/1996 | Robert et al. |
| 5,699,764 A | 12/1997 | Allen et al. |
| 5,743,231 A | 4/1998 | Reinosa |
| 5,748,500 A | 5/1998 | Quentin et al. |
| 5,759,013 A | 6/1998 | Miyazaki et al. |
| 5,797,732 A | 8/1998 | Watanabe et al. |
| 5,823,750 A | 10/1998 | Hoffmann et al. |
| 5,894,825 A | 4/1999 | Duerr |
| 5,942,988 A | 8/1999 | Snyder et al. |
| 5,957,240 A | 9/1999 | Apostolides |
| 5,964,256 A * | 10/1999 | Bedi et al. .................... 141/83 |
| 6,215,728 B1 * | 4/2001 | Yamada .................. 365/233.5 |
| 6,216,732 B1 | 4/2001 | Apostolides |
| 6,461,118 B1 | 10/2002 | Apostolides et al. |
| 6,542,851 B2 * | 4/2003 | Hasegawa et al. .......... 702/182 |
| 6,544,008 B1 | 4/2003 | Apostolides et al. |
| 6,561,219 B1 | 5/2003 | Apostolides |
| 2003/0150256 A1 | 8/2003 | Jakoby et al. |
| 2003/0202887 A1 | 10/2003 | Apostolides et al. |

OTHER PUBLICATIONS

"Lubrigard Oil Condition Monitoring—The Company," accessed Dec. 3, 2002, http://www.lubrigard.com/company.htm, 2 pages.

RPM Industries, Inc., "Prelub Plus [Protection from the Start]," tri–fold brochure, Mar. 2, 1999, United States, 6 pages.

RMP Industries, Inc., "Prelub Plus Oil Evacuation System," dual sided brochure, Feb. 2, 1999, United States, 2 pages.

RPM Industries, Inc., "Prelub Plus—The engine–saving, money–saving, time–saving starter system," single page brochure, Jun. 22, 1999, United States, 1 page.

RPM Industries, Inc., Prelub The Simple Solution, tri–fold brochure, May 6, 1992, United States, 2 pages.

U.S. Appl. No. 08/961,339, filed Oct. 30, 1997.

U.S. Appl. No. 9/435,375, filed Nov. 5, 1999.

U.S. Appl. No. 9/772,604, filed Jan. 30, 2001.

U.S. Appl. No. 10/414,360, filed Apr. 15, 2003.

U.S. Appl. No. 09/836,610, filed Apr. 16, 2003.

U.S. Appl. No. 10/347,958, filed Jan. 21, 2003.

International Search Report for International Application PCT/US 02/02415, Oct. 10, 2002.

Oil X–Changer Systems, www.x–change–r.com Internet Website, printed Feb. 18, 2003, 12 pages.

U.S. Appl. No. 10/820,551, filed Apr. 8, 2004.

* cited by examiner

FIG. 10

| 902 Start Event | 904 Date | 906 Time | 908 Battery Voltage (V) | 910 Current (A) | 912 Machine Temperature (Degrees F) | 914 Time to Pressure (seconds) | 916 Average Time to Pressure (seconds) | 918 Service Meter Reading (Machine Hours) | 920 Oil Change Event | 922 Time to Evacuate (seconds) | 924 Actual Hours between Oil Changes | 926 Record Fault |
|---|---|---|---|---|---|---|---|---|---|---|---|---|
| 1 | 1-Feb | 12:15 | 24 | 180 | 225 | 8.0 | 8.0 | 2502 | • | 57.5 | | |
| 2 | 2-Feb | 14:45 | 24 | 180 | 227 | 7.0 | 7.5 | 2505 | | | | |
| 3 | 3-Feb | 23:15 | 24 | 180 | 203 | 9.0 | 8.0 | 2509 | | | | |
| 4 | 4-Feb | 5:45 | 24 | 180 | 190 | 7.0 | 7.8 | 2512 | | | | |
| 5 | 7-Feb | 7:30 | 24 | 180 | 45 | 12.0 | 8.6 | 2520 | | | | Yes |
| 6 | 14-Feb | 3:15 | 24 | 180 | 197 | 9.0 | 8.7 | 2529 | | | | |
| 7 | 21-Feb | 20:30 | 16 | 155 | 30 | 15.0 | 9.6 | 2539 | | | | Yes |
| 8 | 28-Feb | 22:15 | 24 | 155 | 50 | 13.0 | 10.0 | 2549 | | | | |
| 9 | 7-Mar | 4:30 | 24 | 180 | 89 | 10.0 | 10.0 | 2559 | | | | |
| 10 | 14-Mar | 11:45 | 24 | 180 | 95 | 11.0 | 10.1 | 2569 | | | | |
| 11 | 21-Mar | 1:15 | 24 | 180 | 165 | 13.0 | 10.4 | 2577 | | | | |
| 12 | 28-Mar | 5:30 | 24 | 180 | 208 | 11.5 | 10.5 | 2587 | | | | |
| 13 | 4-Apr | 6:45 | 24 | 180 | 208 | 14.0 | 10.7 | 2592 | | | | Yes |
| 14 | 11-Apr | 12:30 | 24 | 180 | 90 | 12.0 | 10.8 | 2690 | | | | |
| 15 | 18-Apr | 10:45 | 24 | 180 | 86 | 14.0 | 11.0 | 2720 | | | | Yes |
| 16 | 25-Apr | 18:15 | 24 | 180 | 32 | 16.0 | 11.3 | 2745 | | | | Yes |
| 17 | 2-May | 17:45 | 24 | 250 | 37 | 18.0 | 11.7 | 2863 | • | 60.2 | 361 | Yes |
| 18 | 9-May | 15:15 | 24 | 180 | 77 | 12.0 | 11.8 | 2877 | | | | |
| 19 | 16-May | 12:45 | 24 | 180 | 209 | 10.0 | 11.7 | 2901 | | | | |
| 20 | 23-May | 1:45 | 24 | 180 | 188 | 12.0 | 11.7 | 2910 | | | | |

METHODS AND SYSTEMS FOR COLLECTING AND PROCESSING DATA IN ASSOCIATION WITH MACHINE OPERATION AND MAINTENANCE

BACKGROUND

Machines such as large-capacity diesel engine systems used in connection with construction equipment, earth-moving equipment, transportation equipment (e.g., locomotives) and the like, are often implemented in adverse operating conditions. Typical operating conditions for such equipment can require extensive maintenance, repair and overhaul work to sustain the equipment and its components, including the engine systems. As a consequence of adverse equipment operating conditions, certain equipment components may be exhausted long before the expected end of their useful lives. This component exhaustion can occur despite efforts to ensure proper component installation and maintenance, including periodic maintenance of equipment oil supply and lubrication systems, for example. Extensive and premature wear of large-capacity diesel engines, for example, can be caused by a combination of factors, including inadequate lubrication of components prior to engine ignition, failure to adhere to prescribed maintenance schedules, failure to collect and analyze data associated with equipment operation, system malfunction, general misuse of the equipment, and other factors.

Methods and systems for data collection and analysis are therefore needed that can extend the useful life of equipment components. Component movement and interaction during various periods of equipment operation can impact the continued effective operation and useful life expectancy of the engine system. In connection with operation and/or maintenance of the engine system during such periods, important data such as, for example, temperature, oil pressure, time to evacuate an oil sump, and historical data regarding previous engine ignition cycles can be collected and analyzed. Conventional equipment methods and systems, however, typically do not collect and analyze data during various stages of machine operation to assist in operation or maintenance of the machine and its components.

Thus, what are needed are improved methods and systems for collecting and processing data in association with maintenance, repair and general operation of machines and equipment components.

SUMMARY

In one embodiment of the present methods and systems, a method is provided for processing data in connection with operation of a machine. The method includes the steps of detecting at least one condition of the machine during an operational state of the machine, wherein the operational state is selected from the group consisting of a dormant state of the machine and a pre-start state of the machine; collecting data indicative of the detected condition; and, performing at least one of storing the collected data and analyzing the collected data for determining whether a fault condition exists in connection with the detected condition of the machine.

In another embodiment of the present methods and systems, a method is provided for operating an emergency machine. The method includes the steps of initiating activation of the emergency machine in response to receiving a signal indicative of an emergency condition; and, initiating at least one pre-lubrication operation in association with the activation of the emergency machine in response to the emergency condition signal.

Various aspects of the method embodiments discussed herein can also be provided in accordance with various system and computer-readable media embodiments.

BRIEF DESCRIPTION OF THE DRAWINGS

FIG. 10 includes a spreadsheet schematic illustrating examples of data that may be collected, stored and/or analyzed in accordance with practice of the present methods and systems.

DESCRIPTION

The term "machine" as applied herein may include any equipment suitable for use in accordance with the present methods and systems. Examples of "machines" as applied herein can include, without limitation, a lubrication system, engines, diesel engines, large-scale diesel engines, motors, rotating equipment, generators, emergency generators, compressors, equipment that includes a machine (e.g., such as mining equipment, construction equipment, marine equipment, and the like), and other like machines.

Figure 1:
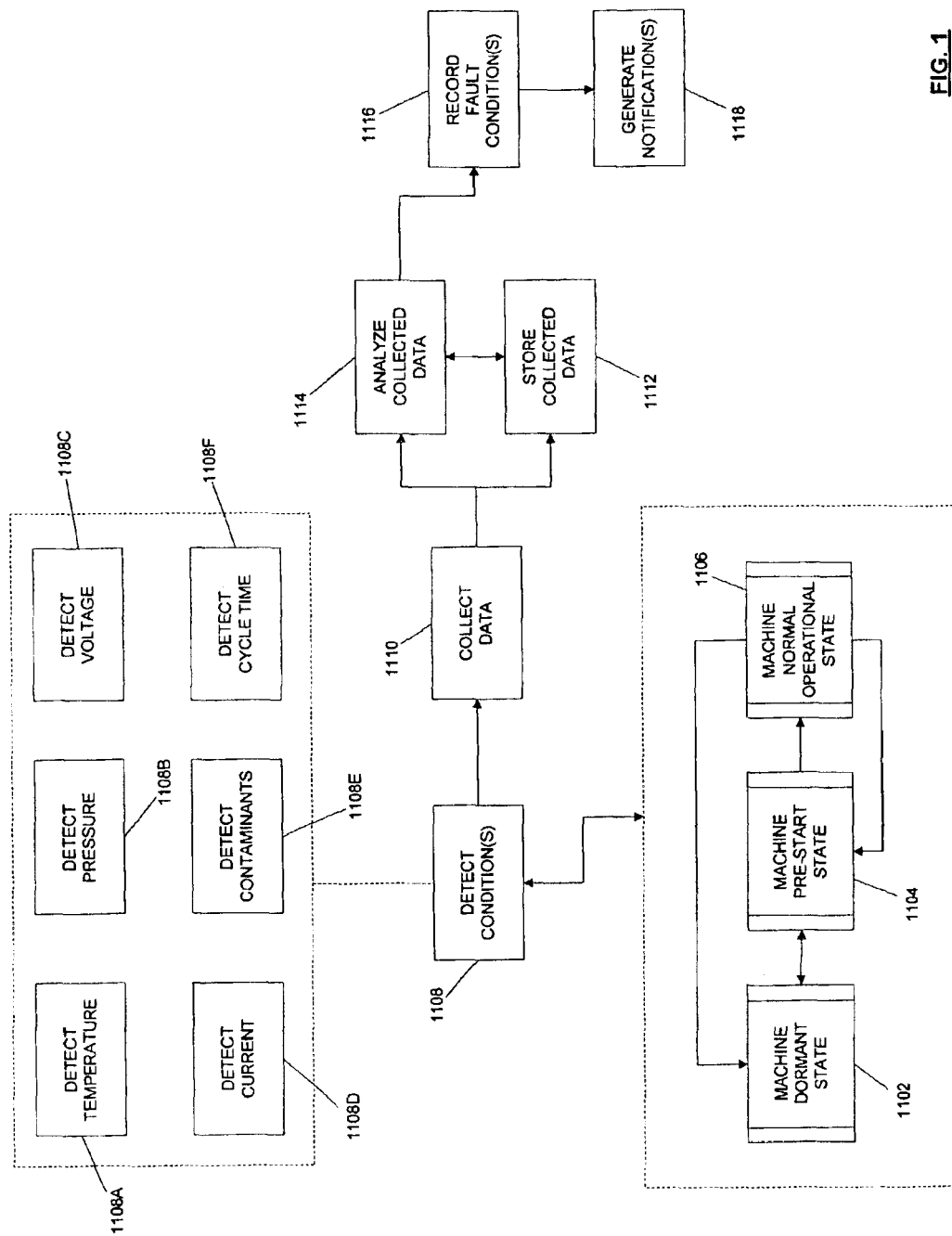
FIG. 1 is a schematic diagram showing an overview of machine operational stages and data collection, storage and analysis that may be performed in accordance with the present methods and systems.

Referring now to FIG. 1, the general operational stages of a machine are shown in accordance with discussion of the present methods and systems. For convenience of disclosure, operation of the machine can be described in three general stages. In stage 1102, the machine is in a dormant state in which the machine has not been powered to any significant degree to perform normal operation. Various operations such as, for example and without limitation, fluid changes, component replacement, and other service type repairs may be performed on the machine in the dormant state 1102. In stage 1104, the machine is in a pre-start state wherein the machine has not yet achieved its full operating condition. The pre-start state of stage 1104 is associated with operation of the machine, through and including cranking of the machine up to a normal operational state of the machine. As applied herein, normal operational state for an internal combustion engine, for example, is achieved when combustion is initiated in the internal combustion engine. Various operations, such as, for example, pre-lubrication operations (described hereinafter in more detail), maintenance operations, and/or diagnostic operations may be performed on the machine in the pre-start state 1104. In stage 1106, the machine is in a normal operational state in which it achieves a full or near full operating condition. In the normal operational state 1106, the machine is employed for its intended purpose (such as a diesel engine, for example, providing locomotion to a locomotive or automobile). It can be appreciated that the machine may return to either the dormant state 1102 or the pre-start state 1104 from the normal operational state 1106.

At stage 1108, various conditions of the machine in its various states of operation 1102, 1104, 1106 can be detected by one or more sensors (described hereinafter in more detail), for example, operatively associated with the machine. Examples of various sensors applied at stage 1108 are illustrated in FIG. 1. Sensors applicable to operation of a machine can include, without limitation, sensors to detect temperature 1108A, sensors to detect pressure 1108B, sensors to detect voltage 1108C, sensors to detect current 1108D, sensors to detect contaminants 1108E, sensors to detect cycle time 1108F and/or other sensors suitable for detecting various conditions experienced by the machine during the various stages 1102, 1104, 1106 of operation of the machine.

Referring again to FIG. 1, at stage 1110, data can be collected from the sensors (applied in stage 1108) and stored in stage 1112 and/or analyzed in stage 1114. In various aspects of the present methods and systems, data may be stored and/or analyzed with methods and/or systems that are locally or remotely positioned with respect to the machine. In other aspects of the present methods and systems, collected data may be stored in association with one or more stages 1102, 1104, 1106 of the operation of the machine. Once the data are stored and/or analyzed, one or more fault conditions can be identified from analysis of the collected data in connection with operation of the machine. These fault conditions may be recorded in stage 1116, and one or more notifications associated with the fault conditions may be generated in stage 1118. In various embodiments disclosed herein, notifications generated in stage 1118 may include communication of audible signals, visual signals or some reasonable combination of such signals. In accordance with various embodiments discussed herein, such notification signals may be, for example, recorded on a data storage, communicated by satellite communications, and/or communicated in accordance with a protocol such as IEEE 802.11, for example, among other similar types of communication and storage methods and systems.

Figure 2:
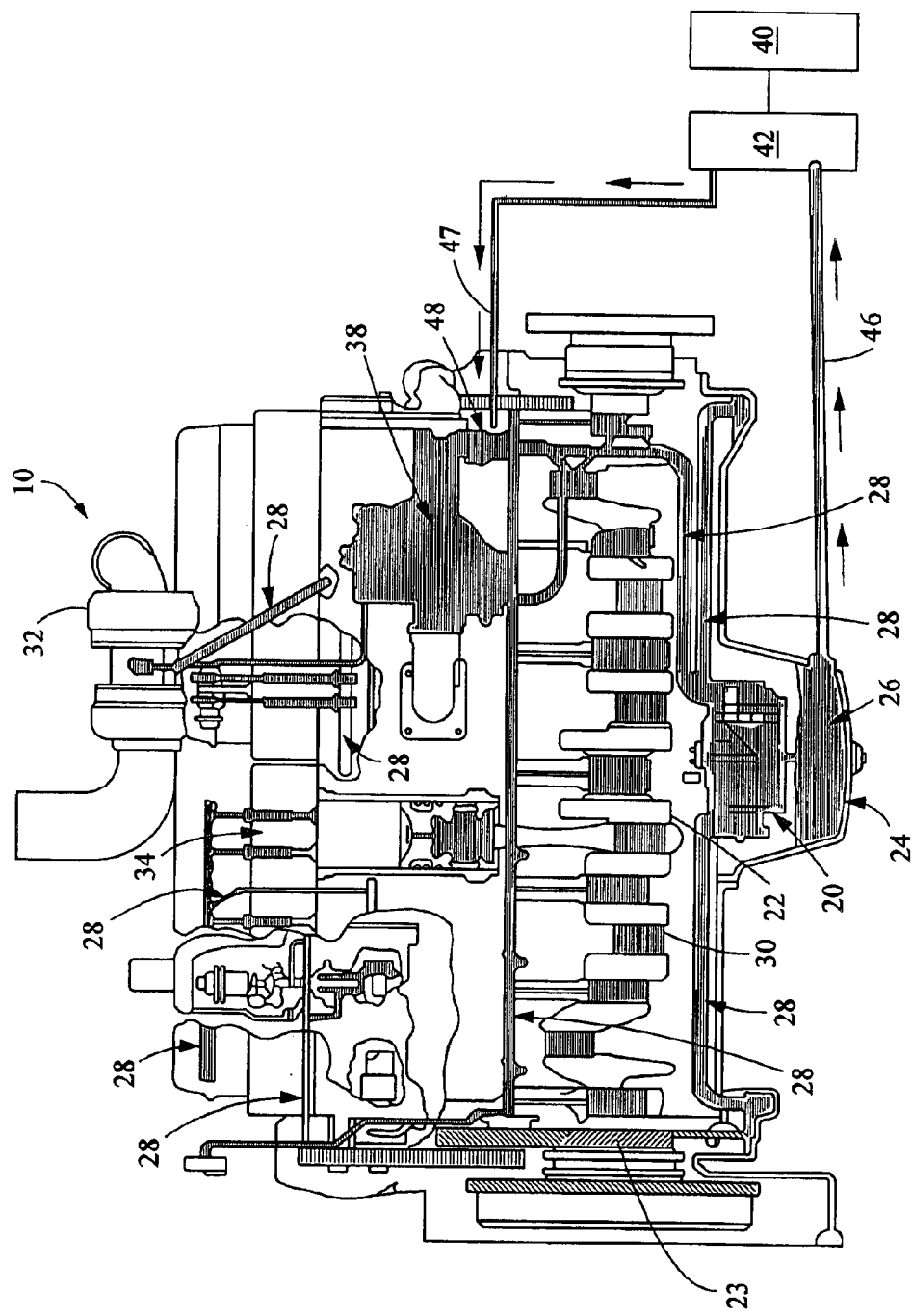
FIG. 2 is a side view in partially schematic form of a diesel engine, with portions broken away or not shown for convenience of illustration.

Referring now to FIG. 2, for purposes of illustration of the present methods and systems, a diesel engine 10 is shown having portions removed and/or broken away for convenience of illustration of the lubrication system of the engine 10. It can be appreciated that the diesel engine 10 is shown and described herein merely for purposes of convenience of disclosure and illustration and that many other machines, as defined herein, can be employed in accordance with the various embodiments of the present systems and methods. In general, the lubrication system includes a main oil pump 20 that is mechanically driven from the crankshaft 22 of the engine 10. When actuated by rotation of crankshaft 22, the main oil pump 20 draws oil from a sump 24 through a screening element 26 and distributes it under pressure through a plurality of conduits 28. The pressurized oil is delivered to the crankshaft bearings 30 of the engine 10, to the turbocharger unit 32, to the valve train assembly 34, to the pistons 36, through a filtering assembly 38, and to other engine components that require lubrication. It can be appreciated that one or more valves and/or passages (not shown) may be included within the lubrication system of the engine 10 to control the flow of oil provided to various engine components.

Figure 3:
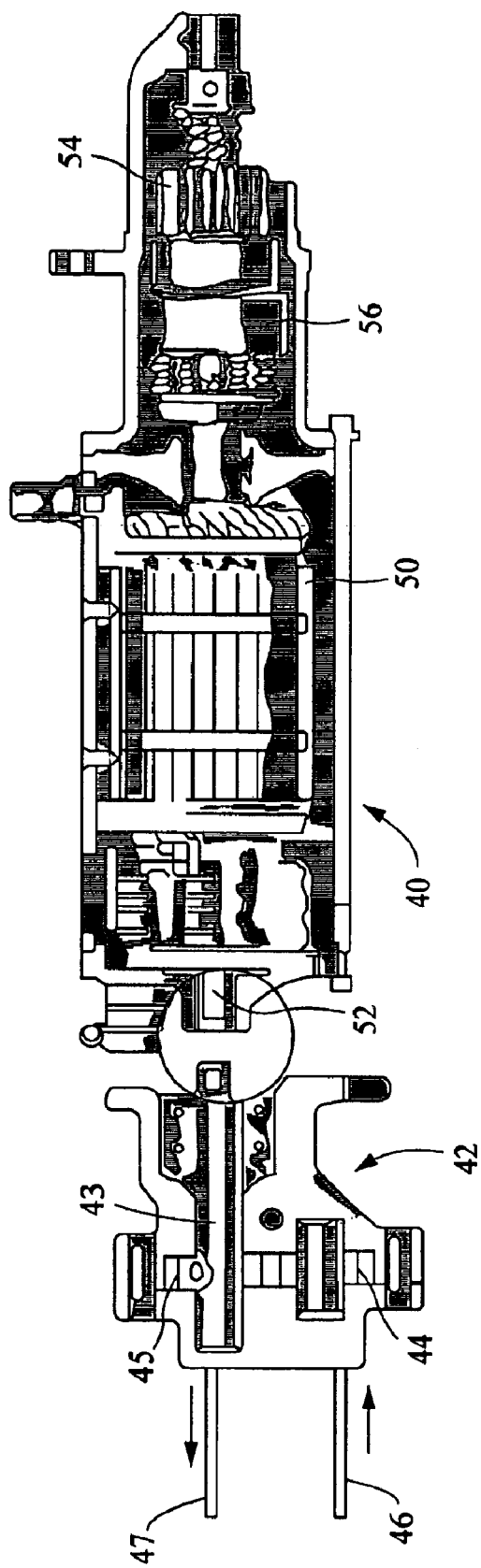
FIG. 3 is a sectional side view of a starter and a pre-ignition oil pump mechanism structured for use in connection with the diesel engine shown in FIG. 2.

Referring now to FIGS. 2 and 3, during operation of the engine 10, the main oil pump 20 is not actuated until the crankshaft 22 begins to rotate due to the operation of an electromechanical starter assembly 40. The starter assembly 40 can be conventional in configuration and can include a direct current motor assembly 50 having an armature shaft 52 extending therethrough. The armature shaft 52 supports a starter gear 54 adjacent to one end of the starter assembly 40. The starter gear 54 engages a flywheel 23 to rotatably drive crankshaft 22 when actuated. A bendix drive mechanism 56 controls the axial movement of the starter gear 54 to engage and disengage the starter gear 54 from the flywheel 23. Because a significant time period can elapse before the main oil pump 20 is able to achieve normal operating oil pressure in the lubrication system, vital components of the engine 10 may move and interact through a number of cycles with little or no lubrication pressure. This can result in undesirably excessive wear and premature failure of engine components.

In one embodiment of the present methods and systems, a pre-lubrication electromechanical system can be activated prior to combustion in the engine 10 and rotation of the crankshaft 22. The pre-lubrication system can be employed to achieve normal operating oil pressure before initial movement and interaction of engine 10 components. To provide lubrication to the engine 10 components, the pre-lubrication system can include a supplemental oil pump 42 operatively connected to the starter assembly 40. In one aspect, the supplemental oil pump 42 can include a mechanically driven gear-type oil pump having an elongated drive shaft 43 and gears 44 and 45. It can be seen that the supplemental oil pump 42 communicates with the lubrication system of the engine 10 through an oil inlet line 46, an oil output line 47, and a check valve 48. In one embodiment, the drive shaft 43 of the supplemental oil pump 42 may be connected to the armature shaft 52 of the starter motor 40 opposite the starter gear 54 in any convenient manner, so that the two shafts 43, 52 can rotate together. Although not shown in the drawings, the supplemental oil pump 42 and the starter motor 40 may be conveniently incorporated within a single housing to form an integral unit. In certain embodiments of the present methods and systems, the supplemental oil pump 42 can be installed as an on-board component of the engine 10, or as a remotely positioned external pump.

In another aspect of the present methods and systems, the check valve 48 can be mounted on the engine 10 adjacent to the outlet line 47 to resist oil backflow while the supplemental oil pump 42 is inoperative. This check valve 48 can also resist spinning of the starter assembly 40 caused by oil flow during normal operation of the engine 10. It can be seen that failure of the supplemental oil pump 42 would not render the engine 10 inoperative, thereby avoiding potentially expensive down-time and maintenance for the engine 10 and its associated equipment. Likewise, because the supplemental oil pump 42 pumps oil through the filtering assembly 38 before the oil enters the engine 10, failure of the supplemental oil pump 42 would not likely introduce damaging particles into the engine 10.

Figure 4:
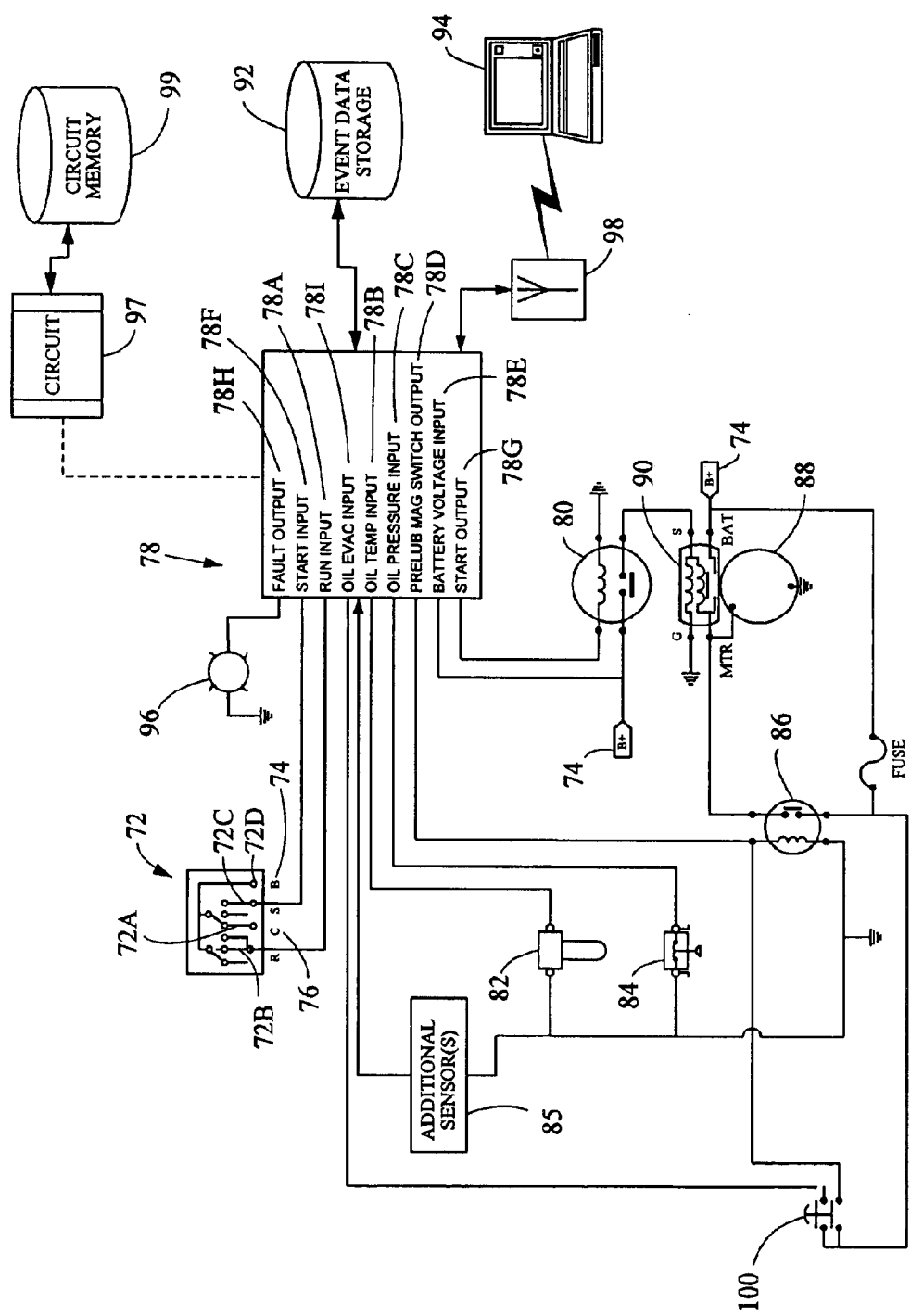
FIG. 4 is a partially schematic circuit diagram showing one system embodiment of the present systems for data collection and processing in conjunction with machine operations.
Figure 5:
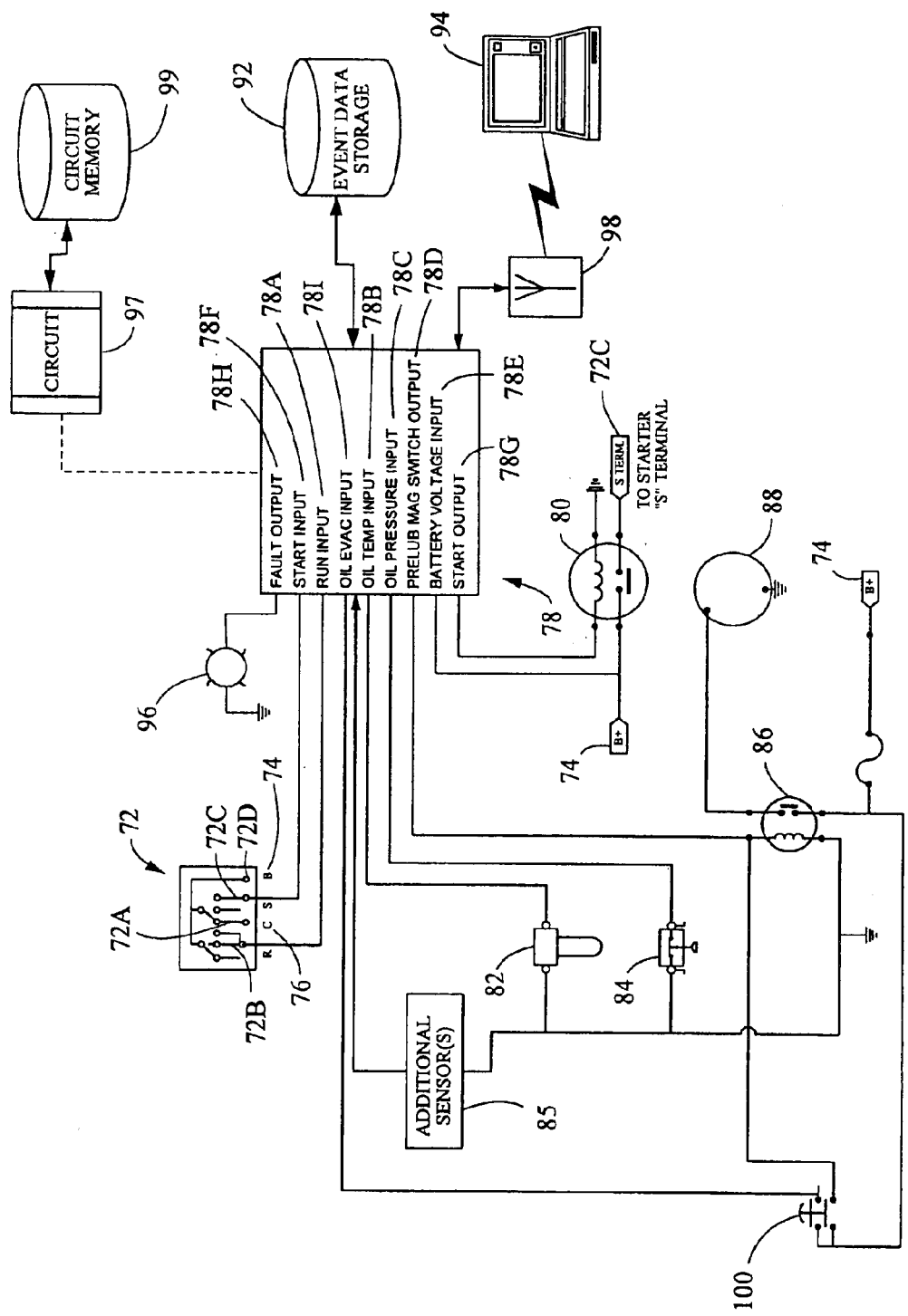
FIG. 5 is a partially schematic circuit diagram showing an alternative system embodiment of the system shown in FIG. 4.
Figure 6:
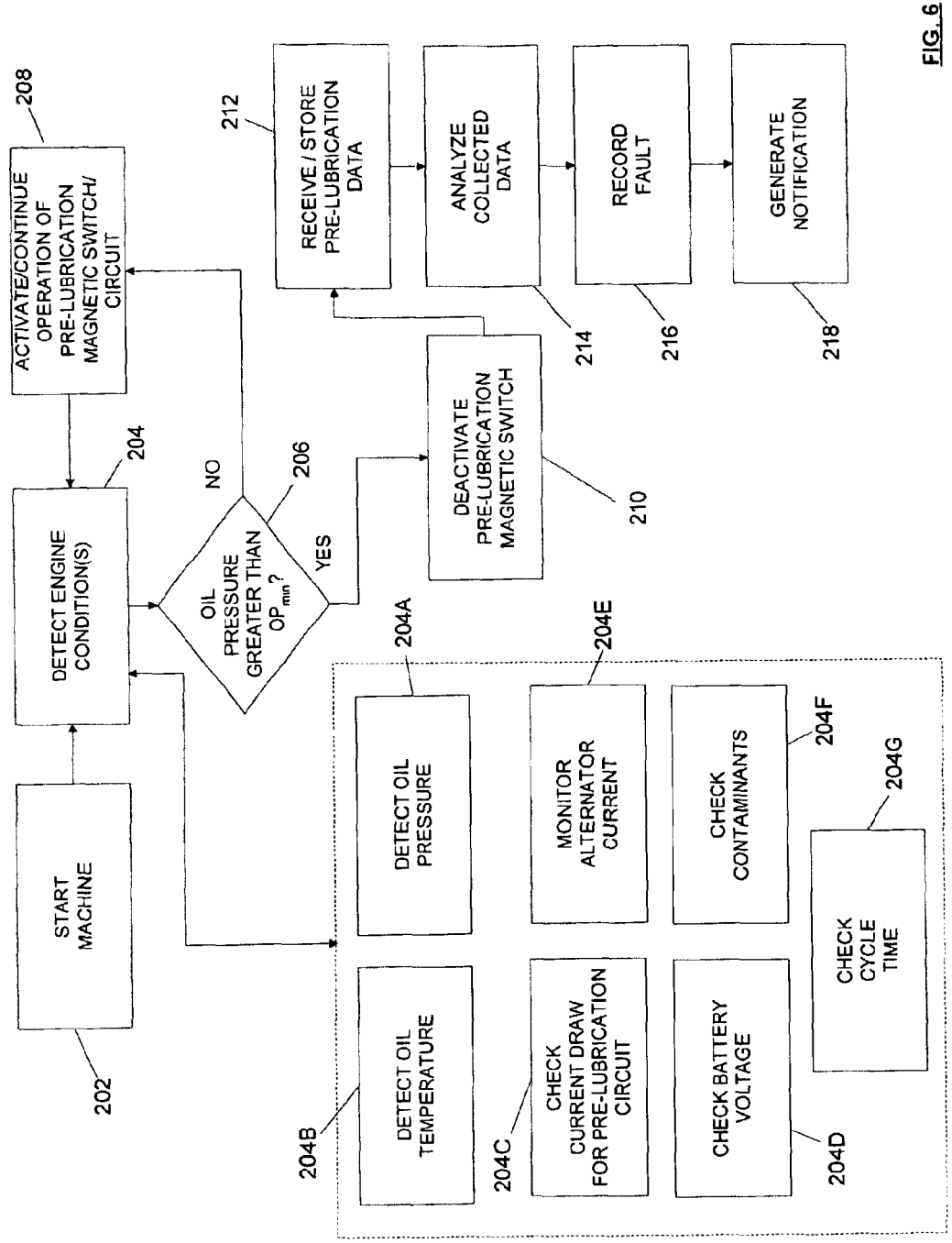
FIG. 6 is a process flow diagram illustrating one method embodiment of the present methods for data collection and processing in connection with machine operations.
Figure 7:
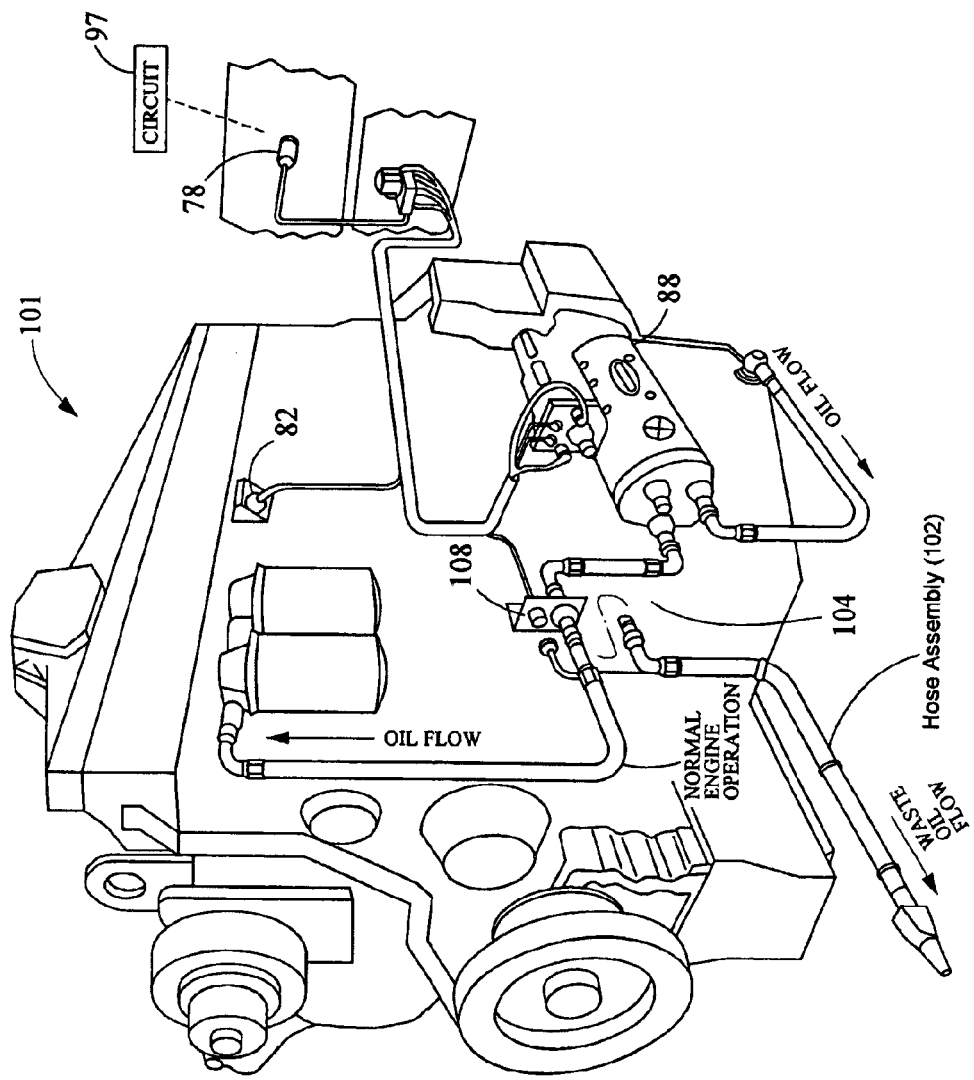
FIG. 7 is an isometric view in partially schematic form of a diesel engine with certain portions and components of the engine not shown for convenience of illustration.
Figure 8:
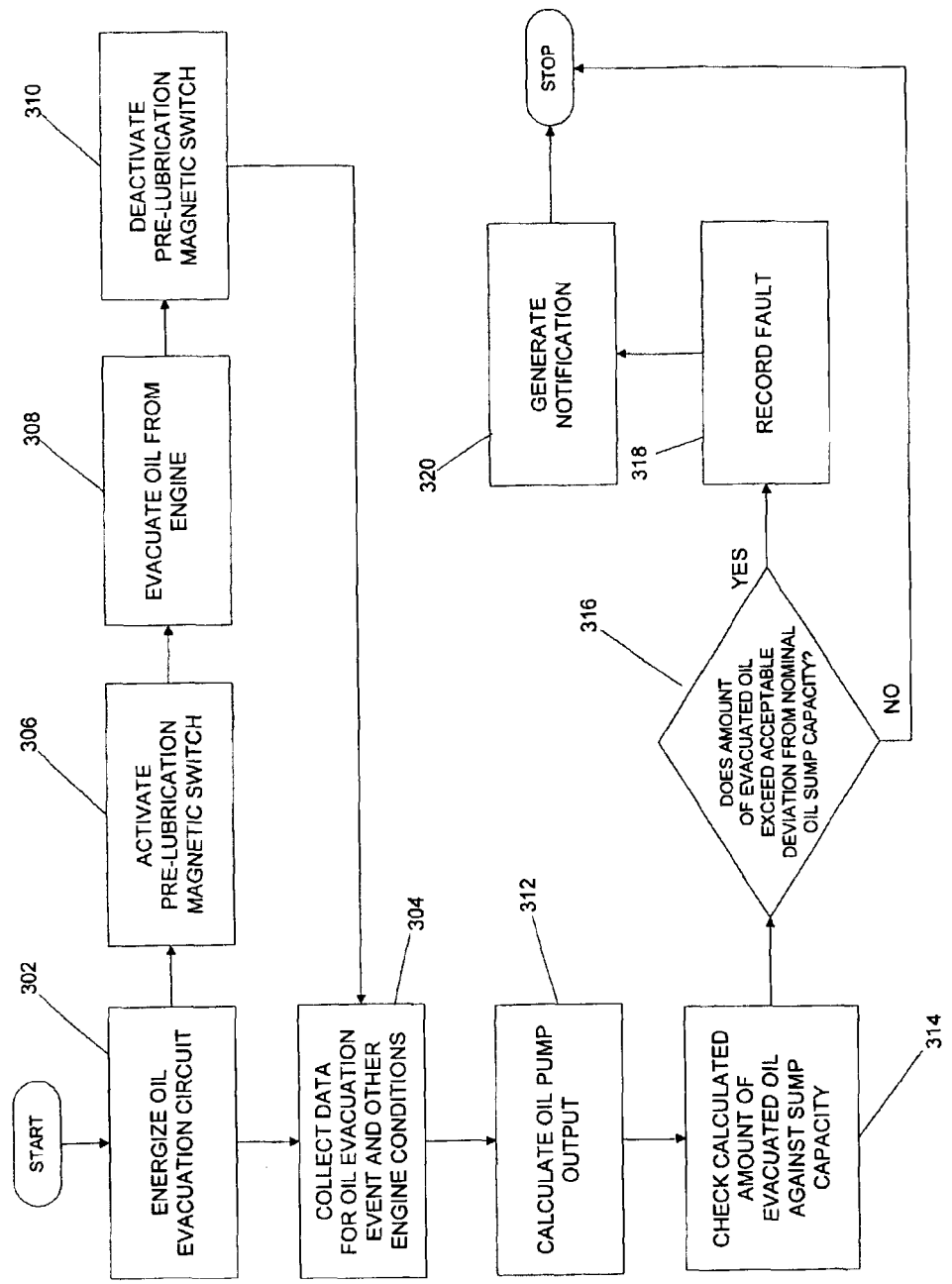
FIG. 8 is a process flow diagram illustrating one method embodiment of the present methods for data collection and processing in connection with machine operations.

Referring now to FIGS. 4 through 6, in one illustrative embodiment of the present methods and systems, a three-position machine key switch 72 configured to function in connection with a machine such as an engine, for example, includes an off position 72A, a run position 72B, and a crank or start position 72C. As shown, the machine key switch 72 can be powered through a battery terminal 72D by a battery 74 or another equivalently suitable power source effective to energize the switch 72. In the off position 72A, it can be appreciated that an electrical system activated by the switch 72 is inoperative. In the off position 72A, the switch 72 can be grounded to the chassis 76 of a piece of equipment in which the engine has been installed. In one illustrative embodiment, the engine can include a large-capacity diesel engine, for example, whose operation is consistent with the engine components and functions previously discussed hereinabove.

In step 202, when the key switch 72 moves through the run position 72B (e.g., such as by manual or automatic functionality), the machine key switch 72 transmits an electrical signal to a run input 78A of an electronic control module 78. When the switch 72 is in the run position 72B, it can be appreciated that a start relay 80 for the engine may remain electrically inactive to maintain engine components in a dormant state prior to performance of pre-lubrication operations, for example, in the engine. For example, an operator of the machine may manually move the key switch 72 to the start position 72C, through the run position 72B, to crank the engine of machine to initiate engine ignition. It can be appreciated that various aspects of the present methods and systems engage and function substantially automatically when the key switch 72 moves through the run position 72B, with or without intervention by an operator, for example. The electronic control module 78 includes an oil temperature input 78B for receiving electrical signals from an oil temperature sensor 82 configured to detect oil temperature in the engine. The electronic control module 78 also includes an oil pressure input 78C for receiving electrical signals from an oil pressure switch 84 configured to detect an oil pressure level in the engine. The electronic control module 78 may also include one or more inputs for one or more additional sensors 85 that are operatively configured to detect conditions during machine operation. In one aspect, the electronic control module 78 can include a battery voltage input 78E for receiving input from one or more batteries 74 operatively associated, for example, with a start relay 80.

An example of an additional sensor 85 that may be used in accordance with the present methods and systems is a contamination sensor marketed under the "LUBRIGARD" trade designation (Lubrigard Limited, United Kingdom, North America, Europe). A contamination sensor can provide information regarding oxidation products, water, glycol, metallic wear particles, and/or other contaminants that may be present in the engine oil, hydraulic oil, gearbox oil, transmission oil, compressor oil and/or other fluids used in various machines. In various aspects of the present methods and systems, the contamination sensor may be employed during one or more pre-lubrication operations, for example, performed on a machine prior to initiation of cranking and/or ignition of the machine.

In step 204, the system can detect one or more engine conditions by employing the sensors 82, 84, 85. In step 204A, for example, the system can check engine oil pressure using the sensor 84. In step 204B, for example, the system can check oil temperature in the engine using the sensor 82. In step 204C, for example, the system can check the amount of current drawn by the pre-lubrication circuit. In step 204D, for example, the system can check the voltage of one or more batteries used in the engine to power various components employed in the present methods and systems. In step 204E, for example, the system can check alternator current prior to and during engine operation. In step 204F, for example, the system can check for the presence of contaminants (such as oil contaminants, for example) in the engine. In step 204G, for example, the system can check the amount of time that has elapsed for performance of one or more cycles of various engine operations (i.e., cycle time) such as pre-lubrication operations or fluid evacuation operations, for example.

In step 206, in the method provided in FIG. 6 for illustration purposes, if the oil pressure of the engine is not within a desirable predetermined range $OP_{min}$ (e.g., greater than a predetermined pounds per square inch threshold), then a pre-lubrication magnetic switch 86 is energized in step 208. The pre-lubrication magnetic switch 86 can be activated by transmission of an electrical signal from a pre-lubrication magnetic switch output 78D of the electronic control module 78. In accordance with the previously discussed pre-lubrication operations, the engine can include a supplemental oil pump 88 and an operatively associated pre-lubrication starter 90 that pump oil through the engine prior to movement and interaction of components upon cranking and ignition of the engine. It can be appreciated that the pre-lubrication magnetic switch 86 remains activated in step 208 as needed to pre-lubricate the engine. As pre-lubrication operations progress, one or more checks of the oil pressure and other engine conditions may be performed in step 204. The current oil pressure level is compared in step 206 against the predetermined $OP_{min}$ threshold, until that threshold is achieved.

In step 210, once sufficient oil engine pressure is achieved as determined by step 206, the pre-lubrication magnetic switch 86 can be deactivated to discontinue oil flow from the supplemental oil pump 88 to the engine. In certain embodiments of the present methods and systems, the supplemental oil pump 88 and/or pre-lubrication starter 90 can be positioned remotely or integrally with regard to operation of the engine lubrication system. In one aspect, the pre-lubrication cycle operations can occur in connection with an operator manually turning the key switch 72 through the run position 72B to the start position 72C to initiate cranking of the engine. In another aspect, the pre-lubrication cycle operations can occur substantially automatically in connection with the key switch 72 moving through the run position 72B to the start position 72C to initiate cranking of the engine. In operation, an electrical signal can be transmitted from the switch 72 to a start input 78F of the electronic control module 78. An electrical signal can also be transmitted from a start output 78F of the electronic control module 78 to the start relay 80 to initiate engine ignition.

In step 212, the electronic control module 78 can receive and store data associated with activation and deactivation of the pre-lubrication magnetic switch 86 and operation of the engine. It can be appreciated that cycle time data and other information can be collected by the electronic control module 78 when pre-lubrication operations are initiated for the engine and also when sufficient engine oil pressure has been achieved. In this manner, a cycle time, for example, can be calculated from analysis of collected data in step 214 to provide an indication of elapsed time for completing pre-lubrication operations. For a given oil temperature or temperature range (e.g., as can be detected and gathered by the temperature sensor 82 in step 204B), an average cycle time, for example, can be calculated through analysis in step 214 from two or more collected cycle times. In one aspect, the present methods and systems can determine whether the most recently elapsed cycle time deviates from a nominal average cycle time, or range of cycle times, for a given oil temperature or temperature range. An unacceptable deviation from a nominal cycle time, or range of times, can result in recording a fault in step 216. It can be appreciated that many other types of fault conditions may detected, analyzed and recorded in connection with practice of the present methods and systems. In other illustrative examples, conditions associated with battery voltage, current, and/or the presence of contaminants in the machine, for example, may be detected, analyzed, and one or more fault conditions recorded.

In one embodiment, fault events can be recorded in step 216 in an event data storage 92 or a computer system 94 operatively associated with the electronic control module 78. In another embodiment, fault events can be stored on a circuit 97 and an operatively associated circuit memory 99. A notification can be generated in step 218 in the form of illuminating a warning light 96 or a display, for example, or another suitable audible, visual and/or audiovisual warning indication. The warning light 96 can be illuminated, for example, by an electrical signal transmitted to the warning light 96 from a fault output 78H of the electronic control module 78. It can be seen that the data collection and analysis provided in accordance with the present methods and systems permit maintenance personnel to identify and address potential issues with machine operations.

Collected and analyzed information, as well as recorded fault events, can be stored in association with the electronic control module 78, the circuit 97, and/or at a remote location. In various embodiments of the present methods and systems, the electronic control module 78 and/or the circuit 97 can be configured for operation as integral components of a machine or as remote components not installed locally on the machine. The collected and analyzed information can be stored in the event data storage 92 shown in FIGS. 4 and 5, or on another conventional storage suitable for use in connection with the electronic control module 78. The information can also be stored externally with respect to the equipment and its engine. As shown, data such as fault data, for example, can be transmitted wirelessly by a radio frequency transmitter 98 or by a wireline connection from the electronic control module 78 to the computer system 94. A personal digital assistant, for example, may be employed as the computer system 94 to receive and process data collected from the electronic control module 78 regarding pre-lubrication and fluid maintenance operations, for example. Information related to a battery operatively associated with the start relay 80, for example, can be transmitted to the battery voltage input 78E of the electronic control module 78. If the battery voltage is detected outside a predetermined nominal range, for example, this fault event can be recorded in the event data storage 92 associated with the electronic control module 78. It can be appreciated that fault data may be used for future corrective action and/or revising maintenance scheduling for the machine and its components.

In various embodiments of the present methods and systems, data collected from machine operation can be stored on the circuit 97 with its operatively associated circuit memory 99. In one aspect, the circuit 97 can be a "one-shot" circuit, as that term is understood by those skilled in the art. The circuit 97 can be configured to receive and store data related to various conditions of the engine in its dormant state, its pre-start state, and/or its normal operating state. In one embodiment, the circuit 97 can store data in the circuit memory 99 prior to engine ignition and then transfer the stored data to the electronic control module 78, for example, or another computer system, once ignition is initiated. In another embodiment, the circuit 97 can store condition data collected during normal engine operation for subsequent download to the electronic control module 78 or another suitable computer system. In various embodiments, the circuit 97 can be configured for use in data collection and storage when the electronic control module 78 is not otherwise active (e.g., during machine service operations). In this manner, the circuit 97 can be employed to store data corresponding to the electrical events associated with an oil change, for example, and upon machine ignition can transmit the data related to the oil change to the electronic control module 78. In various embodiments, the circuit 78 can be a stand-alone, discrete module, or can be configured for full or partial integration into the operation of the electronic control module 78.

FIG. 5 illustrates an embodiment of the present methods and systems in which a supplemental oil pump 88' is positioned remotely from the lubrication system for the engine. In this embodiment, the supplemental pump 88' is operatively associated the pre-lubrication magnetic switch 86.

Referring now to FIGS. 4 through 8, in another illustrative aspect of the present methods and systems, data can be collected and analyzed in connection with an oil evacuation operation performed on an engine 101, for example. It can be appreciated that one or more of the various components and processes described hereinabove with regard to FIGS. 4 and 5, for example, can be employed in connection with operations of the engine 101.

In an oil change operation, for example, a hose assembly 102 can be coupled to the supplemental oil pump 88 by using a coupler 104 that connects to a bracket 106 of the engine 101 lubrication system. In another embodiment, the supplemental oil pump 88 can be positioned remotely with respect to the location of the engine 101. Once the hose assembly 102 is correctly positioned and connected to the lubrication system of the engine 101, an oil evacuation button 100 can be activated in step 302 to energize the oil evacuation circuit and initiate the process of removing waste oil from the engine 101. The oil evacuation button 100 can also be operatively associated with an oil evacuation input 78I of the electronic control module 78. As described hereinabove, the circuit 97 can include an operatively associated circuit memory 99 that can be employed in substitution for, or in connection with, the electronic control module 78. The oil temperature sensor 82, among other types of sensors, can be positioned and configured in the engine 101 in operative association with the electronic control module 78 to collect and transmit data indicative of conditions (e.g., oil temperature, oil pressure, cycle time, contaminant presence, or other conditions) in the engine 101 in step 304 during the oil change operation.

In step 306, the pre-lubrication magnetic switch 86 is activated (e.g., such as the pre-lubrication magnetic switch 86 described in the context of the embodiments of FIG. 4 or FIG. 5, for example). In step 308, waste oil is caused to drain or evacuate from the lubrication system of the engine 101 through the hose assembly 102. In step 310, once substantially no more oil flows from the engine 101 through the hose assembly 102, the oil evacuation circuit can be deactivated by opening the pre-lubrication magnetic switch 86. This deactivation of the oil evacuation circuit can occur automatically, such as by transmitting an electrical signal from a mechanism (e.g., a flow switch) associated with the hose assembly 102, or by manually activating the oil evacuation button 100, for example.

In step 304, information related to the oil change event, such as the time duration of the oil change, for example, and other engine conditions can be recorded and processed in connection with operation of the electronic control module 78 and/or the circuit 97 and/or their operatively associated storage medium or media. The date and time of the oil change event, for example, can also be recorded for one or more such oil changes. Analysis of the data may assume that a substantially constant volume of oil at a given temperature evacuates from the engine lubrication system in a consistent and repeatable amount of time. In step 312, a calculation can be made that considers the amount of time needed for an oil change at a given temperature (as detected by the oil temperature sensor 82, for example). Using this calculation, the amount of oil evacuated or output from the engine can be calculated. In step 314, the calculated evacuated oil amount is compared against a nominal value for the sump capacity. If the calculated amount is greater than or less than the nominal value or tolerance range, as determined in step 316, this information can be recorded as a fault in step 318 for further investigation and/or maintenance. In one embodiment, the fault recorded in step 318 can be recorded electronically, such as in association with operation of the electronic control module 78 and/or an automatic deactivation device (e.g., such as the flow switch described hereinabove) for the hose assembly 102, for example. In step 320, one or more notifications can be generated for an operator of the engine, for example, to advise the operator that a fault has been recorded by the system. The notification can take the form of an audible signal, a visual or text signal, or some reasonable combination of such signals.

In other embodiments of the present methods and systems, methods and systems are provided for performing one or more pre-lubrication operations in connection with operation of an emergency machine. An "emergency machine" as applied herein can include any machine (as defined hereinabove) that is configured to function in the event that a signal indicative of an emergency condition is communicated to the emergency machine. One illustrative example of an "emergency machine" is a back-up or stand-by generator that is configured to operate upon occurrence of a predetermined emergency condition, such as failure of electrical power supplied by a primary generator system, for example. In other illustrative aspects, the emergency machine can include a generator set (i.e., a "genset" as that term is understood in the art) that can include, for example, a combustion engine driving an electrical generator.

In various applications, an emergency machine may be configured with a preset activation time by which the emergency machine is activated to its normal operational state from the time of occurrence of an emergency condition. It can be appreciated that one of the problems associated with activation and operation of an emergency machine, however, is that the preset activation time may be shorter in duration in comparison to the time needed for sufficient lubrication, for example, of the components of the emergency machine.

Figure 9:
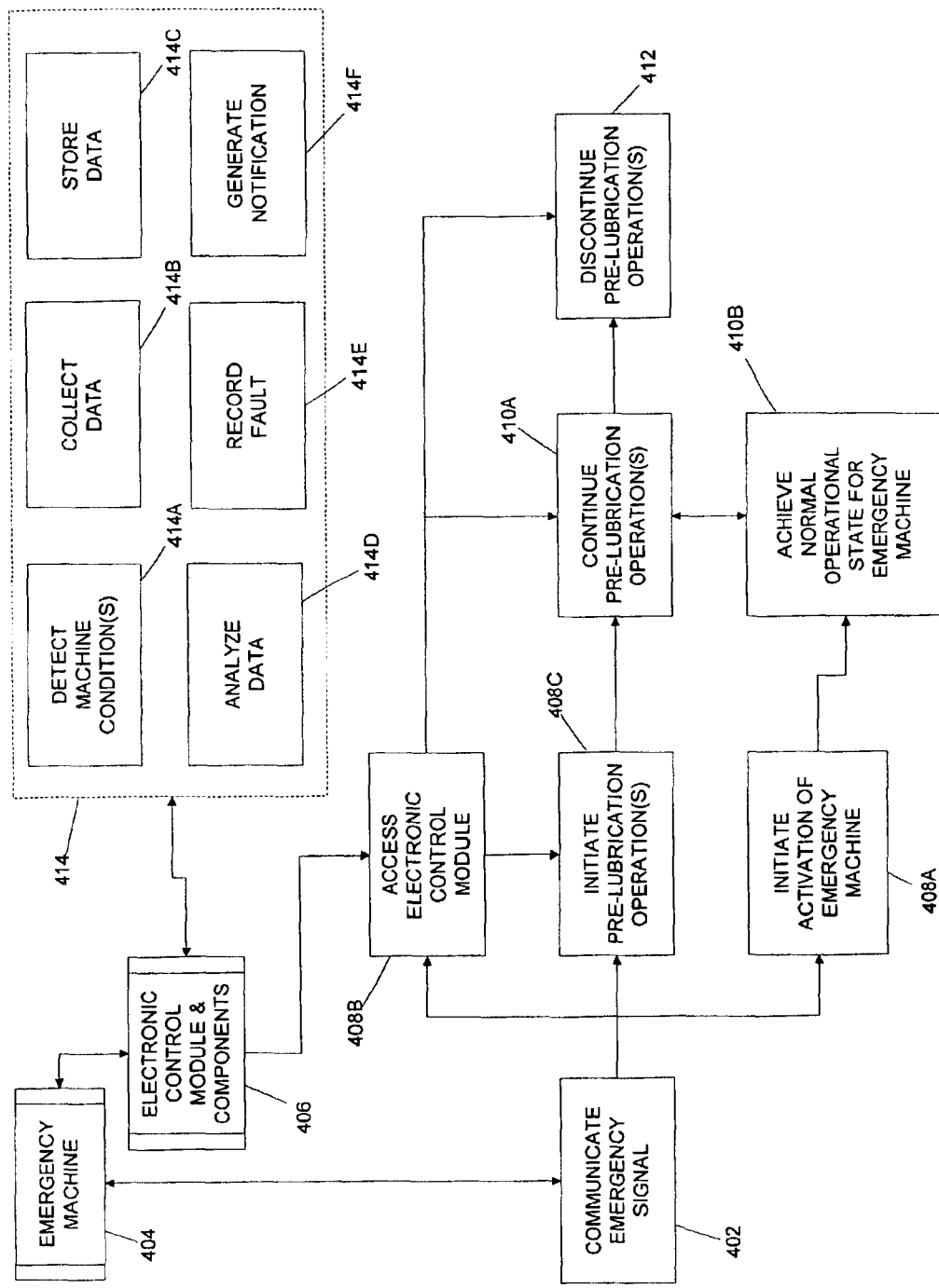
FIG. 9 is a schematic diagram of one embodiment of a method and system for performing a pre-lubrication operation in accordance with the present methods and systems.

Referring now to FIG. 9, one illustrative embodiment of a method and system for lubricating an emergency machine in connection with activation and operation of the emergency machine is provided. In step 402, a signal indicative of an emergency condition is communicated to an emergency machine 404 by a conventional method or system for communicating such emergency signals. In one or more aspects, the emergency machine 404 can be provided as a machine that operates in general accordance with various embodiments described hereinabove for various machines. An electronic control module and its associated components 406 are operatively associated with the emergency machine 404 and are configured to detect communication of the emergency signal to the emergency machine 404. The electronic control module and components 406 can be provided as an electronic control module and components in general accordance with other aspects and embodiments of the various electronic control modules and components described hereinabove. In addition, the electronic control module and components 406 can be configured to include substantially the same or similar functionality as the various electronic control module and component embodiments described hereinabove. In various aspects of the present methods and systems, the electronic control module and components 406 may include, for example and without limitation, functionality to collect data, analyze data, store data, determine fault conditions, and/or generate notifications in accordance with embodiments previously discussed hereinabove.

In step 408A, as a result of communication of the emergency signal, the emergency machine 404 receives a signal to initiate activation of the emergency machine 404. In addition, as a consequence of communication of the emergency signal, the electronic control module and components 406 can be accessed in step 408B, and a pre-lubrication operation or pre-lubrication operations can be initiated in step 408C in connection with operation of the electronic control module 406. With regard to various aspects, the pre-lubrication operation or operations of step 408C can be provided in analogous accordance with various pre-lubrication operations and components described hereinabove in various embodiments. In can be appreciated that initiation of the pre-lubrication operation or operations of step 408C can occur at substantially the same time as processing of the activation signal by the emergency machine 404 in step 408A.

In step 410A, the pre-lubrication operation or operations continue, as needed, and substantially in parallel with activation of the emergency machine 404, to lubricate the components of the emergency machine 404. In step 410B, a normal operational state of the emergency machine 404 is achieved. It can be seen that, dependent on the preset activation time for the emergency machine 404, the pre-lubrication operation or operations of steps 408C and 410A may lubricate the components of the emergency machine 404 to at least a portion of the extent that would be normally desirable to achieve for the emergency machine 404, if the emergency machine 404 operated under nominal (i.e., non-emergency) conditions. Another benefit to the present methods and systems can be realized by the fact that the time to pressure for the emergency machine 404 will be reduced by the cooperative efforts of the pre-lubrication operation or operations and the lubrication system or systems of the activated emergency machine 404. Once sufficient pressure is achieved in the emergency machine 404, the electronic control module 406 can be accessed in step 408B to discontinue the pre-lubrication operation or operations for the emergency machine 404 in step 412.

In step 414, the electronic control module and components 406 may perform one or more additional functions in accordance with various embodiments of the present methods and systems described hereinabove. In one example, in step 414A, the electronic control module and components 406 may detect machine conditions (e.g., pressure, temperature, contaminant presence, voltage level, current level, and the like) during pre-lubrication operations and/or activation of the emergency machine 404. The electronic control module and components 406 may detect machine conditions in step 414A by using one or more sensors, for example, such as sensors described hereinabove in various embodiments of the present methods and systems. In other example functions, data related to function of the emergency machine may be collected in step 414B and/or stored in a data storage, for example, in step 414C. In another example, the collected and/or stored data may be analyzed in step 414D to determine whether a fault condition exists in association with operation of the emergency machine 404. In other examples, fault conditions may be recorded in step 414E and/or one or more notifications associated with the fault conditions may be generated in step 414F.

OPERATIONAL EXAMPLE

Referring now to FIG. 10, examples of data collected and analyzed in accordance with the present methods and systems are provided schematically in spreadsheet format. It can be appreciated that various tolerances, operational ranges, acceptable deviations, and other parameters and statistical methods can be predefined and varied in accordance with practice of the present methods and systems. Selection of such parameters may be dependent, for example, on machine operator preferences, machine specifications, and/or other factors.

The data shown in FIG. 10 are recorded on a per event basis for each time that a given machine is started. Each event has a number designation shown in column 902. It can be appreciated that the number designations of column 902 are presented merely for convenience of disclosure, and that more or less than the total number of events shown in FIG. 10 may be collected, stored and/or analyzed in connection with the present methods and systems.

Each event is stamped with a date (column 904) and a time (column 906) when a machine start is performed. In column 908, battery voltage can be recorded in volts. In one operative example of the present methods and systems, if the battery voltage of column 908 is detected and recorded as less than 18V or greater than 24V, a record fault designation of "YES" can be included in column 926. In column 910, current flow associated with machine operation can be collected and recorded. In another operative example of the present methods and systems, if the current of column 910 is detected and recorded as less than 150 A or greater than 225 A, then a record fault designation of "YES" can be included in column 926. While the terms "YES" and "NO" are applied to this example to indicate a fault condition, it can be appreciated that many other fault designations are equally suitable for use in accordance with the present methods and systems. For example, in another illustrative aspect, the use of "HIGH" and "LOW" designations could be applied in connection with the battery voltage values shown in column 908.

In column 912, a machine temperature can be stored that is a temperature of oil or water, for example, or another fluid employed by the machine. In column 914, time to pressure can be collected and stored. In a pre-lubrication operation, for example, time to pressure may indicate that an acceptable oil pressure has been achieved in a machine sufficient to permit ignition of the machine and safe rotation of its components. An average time to pressure can be calculated in column 916 based on the historical values of column 914. In one aspect, a standard deviation can be calculated for the historical values of column 914, and a number of acceptable standard deviations (e.g., one standard deviation) can be established as a tolerance for the time to pressure values of column 914. As shown in the illustration of FIG. 10, faults can be recorded in column 926 for the events for which a time to pressure value of column 914 exceeds one standard deviation from the average time to pressure of column 916 (e.g., events 5, 7, 13, and 15–17). In another illustrative aspect, the mean of the population of values of column 914 can be calculated and applied, for example, to determine fault conditions. For convenience of disclosure it can be appreciated, however, that just a few statistical methods are disclosed in this operational example. Those skilled in the art can appreciate that many other statistical methods are applicable and may be applied in accordance with practice of the present methods and systems.

In column 918, service meter readings (i.e., machine hours) can be collected and stored for the machine. Column 920 provides an indication of events during which oil changes occur (i.e., events 1 and 17). An oil change event can be stored based on an electrical signal generated, for example, by an internal supplemental pump or an external supplemental pump employed in connection with the oil change event. Time to evacuate oil or other fluid from a machine is provided in column 922, and hours between oil change events can be calculated in column 924. For example, in one operational example of an aspect of the present methods and systems, it can be decided that if less than 225 operating hours or more than 300 operating hours elapse between oil change events, then an indication of a fault is recorded in column 926. In addition, as described hereinabove with respect to FIGS. 7 and 8, an average time to evacuate can be calculated and tolerances established based on a number of standard deviations by which actual time to evacuate values (column 922) deviate from an average value or an expected value or range of values. In another aspect, a tolerance for actual time to evacuate values (column 922) can be established as a percentage of an average value or an expected value or range of values for time to evacuate. It can be appreciated that any number and reasonable combination of parameters and/or statistical methods can be employed in accordance with the present methods and systems to determine when a fault condition should be recorded in column 926.

The benefits of the present methods and systems can be readily appreciated by those skilled in the art. It can be seen that information collected and analyzed during the operational stages of a machine can enhance the effectiveness of the machine and extend the useful life of the machine and its components. Furthermore, it can be appreciated that information collected and analyzed from events associated with machine operation can result in development of proactive maintenance schedules, for example, that are more sensitive to the needs of various machine operations.

The term "computer-readable medium" is defined herein as understood by those skilled in the art. It can be appreciated, for example, that method steps described herein may be performed, in certain embodiments, using instructions stored on a computer-readable medium or media that direct a computer system to perform the method steps. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

As used herein, a "computer" or "computer system" may be a wireless or wireline variety of a microcomputer, minicomputer, laptop, personal data assistant (PDA), cellular phone, pager, processor, or any other computerized device capable of configuration for transmitting and receiving data over a network. Computer devices disclosed herein can include memory for storing certain software applications used in obtaining, processing and communicating data. It can be appreciated that such memory can be internal or external. The memory can also include any means for storing software, including a hard disk, an optical disk, floppy disk, ROM (read only memory), RAM (random access memory), PROM (programmable ROM), EEPROM (extended erasable PROM), and other like computer-readable media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

It can be appreciated that, in some embodiments of the present methods and systems disclosed herein, a single component can be replaced by multiple components, and multiple components replaced by a single component, to perform a given function or functions. Except where such substitution would not be operative to practice the present methods and systems, such substitution is within the scope of the present invention.

Examples presented herein are intended to illustrate potential implementations of the present method and system embodiments. It can be appreciated that such examples are intended primarily for purposes of illustration. No particular aspect or aspects of the example method and system embodiments described herein are intended to limit the scope of the present invention.

While the present methods and systems have been principally described in relation to relatively large-scale diesel engines, it should be recognized that the invention is also useful in a wide variety of other types of internal combustion engines. For example, use of the present methods and systems in automotive applications is contemplated, such as in connection with automotive engines. Thus, whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. A method for processing data in connection with operation of a machine, said method comprising the steps of:
    detecting at least one condition of said machine during an operational state of said machine, wherein said operational state is selected from the group consisting of a dormant state of said machine and a pre-start state of said machine;
    collecting data indicative of said detected condition; and,
    performing at least one of storing said collected data and analyzing said collected data for determining whether a fault condition exists in connection with said detected condition of said machine.

2. The method of claim 1, further comprising using at least one sensor for detecting said condition of said machine.

3. The method of claim 2, wherein said sensor is selected from the group consisting of a temperature sensor, a pressure sensor, a voltage sensor, a current sensor, a contamination sensor, and a cycle time sensor.

4. The method of claim 1, wherein storing said collected data includes storing said data on a data storage means operatively associated with an electronic control module.

5. The method of claim 1, wherein storing said collected data includes storing said data on a data storage means operatively associated with a one-shot circuit.

6. The method of claim 1, wherein said analyzing said collected data includes comparing said collected data to an expected value of said collected data.

7. The method of claim 6, further comprising recording said fault condition based on said comparing said collected data to said expected value of said collected data.

8. The method of claim 1, further comprising recording said fault condition.

9. The method of claim 1, further comprising generating a notification based on said fault condition.

10. The method of claim 1, wherein said operational state includes at least one pre-lubrication operation.

11. The method of claim 1, wherein said operational state includes at least one fluid evacuation operation.

12. A system for processing data in connection with operation of a machine, said system comprising:
    means for detecting at least one condition of said machine during an operational state of said machine, wherein said operational state is selected from the group consisting of a dormant state of said machine and a pre-start state of said machine;
    means for collecting data indicative of said detected condition; and,
    at least one of a means for storing said collected data and a means for analyzing said collected data for determining whether a fault condition exists in connection with said detected condition of said machine.

13. The system of claim 12, wherein said means for detecting includes at least one sensor for detecting said condition of said machine.

14. The system of claim 13, wherein said sensor is selected from the group consisting of a temperature sensor, a pressure sensor, a voltage sensor, a current sensor, a contamination sensor, and a cycle time sensor.

15. The system of claim 12, wherein means for storing said collected data includes data storage means operatively associated with an electronic control means.

16. The system of claim 12, wherein means for storing said collected data includes data storage means operatively associated with a one-shot circuit means.

17. The system of claim 12, wherein said means for analyzing said collected data includes means for comparing said collected data to an expected value of said collected data.

18. The system of claim 17, further comprising means for recording said fault condition in association with said means for comparing said collected data to said expected value of said collected data.

19. The system of claim 12, further comprising means for recording said fault condition.

20. The system of claim 12, further comprising means for generating a notification based on said fault condition.

21. The system of claim 12, wherein said operational state includes at least one pre-lubrication operation.

22. The system of claim 12, wherein said operational state includes at least one fluid evacuation operation.

23. A system for processing data in connection with operation of a machine, said system comprising:

an electronic control module configured for detecting at least one condition of said machine during an operational state of said machine, wherein said operational state is selected from the group consisting of a dormant state of said machine and a pre-start state of said machine;

at least one sensor operatively associated with said electronic control module, said sensor configured for communicating data indicative of said detected condition to said electronic control module; and, said electronic control module being configured for performing at least one of storing said communicated data and analyzing said communicated data for determining whether a fault condition exists in connection with said detected condition of said machine.

24. The system of claim 23, wherein said sensor is selected from the group consisting of a temperature sensor, a pressure sensor, a voltage sensor, a current sensor, a contamination sensor, and a cycle time sensor.

25. The system of claim 23, further comprising at least one data storage configured for operative association with said electronic control module, said data storage configured for storing said communicated data.

26. The system of claim 25, wherein said data storage includes a one-shot circuit.

27. The system of claim 23, wherein said electronic control module is further configured for analyzing said communicated data by comparing said communicated data to an expected value of said communicated data.

28. The system of claim 27, wherein said electronic control module is further configured for recording said fault condition in association with said analyzing said communicated data.

29. The system of claim 23, wherein said electronic control module is further configured for generating a notification based on said fault condition.

30. The system of claim 23, wherein said operational state includes at least one pre-lubrication operation.

31. The system of claim 23, wherein said operational state includes at least one fluid evacuation operation.

32. A computer-readable medium including instructions for performing a method for processing data in connection with operation of a machine, said method comprising the steps of:

detecting at least one condition of said machine during an operational state of said machine, wherein said operational state is selected from the group consisting of a dormant state of said machine and a pre-start state of said machine;

collecting data indicative of said detected condition; and, performing at least one of storing said collected data and analyzing said collected data for determining whether a fault condition exists in connection with said detected condition of said machine.

33. The medium of claim 32, further comprising instructions for using at least one sensor for detecting said condition of said machine.

34. The medium of claim 33, wherein said sensor is selected from the group consisting of a temperature sensor, a pressure sensor, a voltage sensor, a current sensor, a contamination sensor, and a cycle time sensor.

35. The medium of claim 32, wherein storing said collected data includes storing said data on a data storage means operatively associated with an electronic control module.

36. The medium of claim 32, wherein storing said collected data includes storing said data on a data storage means operatively associated with a one-shot circuit.

37. The medium of claim 32, wherein said analyzing said collected data includes comparing said collected data to an expected value of said collected data.

38. The medium of claim 37, further comprising instructions for recording said fault condition based on a result of said comparing said collected data to said expected value of said collected data.

39. The medium of claim 32, further comprising instructions for recording said fault condition.

40. The medium of claim 32, further comprising instructions for generating a notification based on said fault condition.

41. The medium of claim 32, wherein said operational state includes at least one pre-lubrication operation.

42. The medium of claim 32, wherein said operational state includes at least one fluid evacuation operation.

* * * * *

UNITED STATES PATENT AND TRADEMARK OFFICE
CERTIFICATE OF CORRECTION

| | |
|---|---|
| PATENT NO. | : 6,853,954 B2 |
| APPLICATION NO. | : 10/253950 |
| DATED | : February 8, 2005 |
| INVENTOR(S) | : John K. Apostolides |

Page 1 of 1

It is certified that error appears in the above-identified patent and that said Letters Patent is hereby corrected as shown below:

Title Pg, Item (56) U.S. Patent Documents, 1,815,221, delete "Sweetiand" and replace therewith --Sweetland--.

Title Pg, Item (56) Foreign Patent Documents, add the following patent:
--EP 0 416 688 A1  3/13/1991--.

Column 8, Line 50, delete "781" and replace therewith --78I--.

Signed and Sealed this

Fifth Day of February, 2008

JON W. DUDAS
*Director of the United States Patent and Trademark Office*